Jan. 11, 1955 S. W. KLONOSKI 2,699,239
DRIVEN MEMBER AND CLUTCH ASSEMBLY
Filed Oct. 24, 1951

INVENTOR
STEPHEN W. KLONOSKI
BY S. Jay Teller
ATTORNEY

United States Patent Office 2,699,239
Patented Jan. 11, 1955

2,699,239

DRIVEN MEMBER AND CLUTCH ASSEMBLY

Stephen W. Klonoski, Torrington, Conn., assignor to The Torrington Manufacturing Company, Torrington, Conn., a corporation of Connecticut Application October 24, 1951, Serial No. 252,964

12 Claims. (Cl. 192—45)

The invention relates to a driven member and clutch assembly. The driven member is preferably a blower wheel, and more particularly a blower wheel adapted for use in an oil burner but not necessarily so limited.

An oil burner ordinarily includes an oil pump and a blower wheel both driven by the same electric motor. The blower wheel delivers air to a blast tube and the pump is connected with a nozzle which is near the discharge end of the blast tube and which atomizes the oil and mixes it with the air delivered through the tube. When the motor is de-energized it is rapidly decelerated and stopped by reason of its connection to the oil pump. However, notwithstanding the rapid deceleration of the motor and of the pump, a small residue of oil is discharged by the nozzle, and it is important that the supply of air be continued for a few seconds in order to insure complete combustion of all of the oil. In order that the blower wheel may continue to rotate, notwithstanding the rapid deceleration of the motor, it has been heretofore proposed to drive the blower wheel by means of an overrunning clutch.

The present invention relates to an assembly in many respects similar to that disclosed and claimed in the co-pending application of Peter M. Sampatacos and Stephen W. Klonoski, Serial No. 137,912 for Driven Member and Clutch Assembly. The general object of the present invention is to provide a driven member and clutch assembly similar to that set forth in the said application but having certain improved features as hereinafter explained in detail. The improvements serve in part to provide greater reliability of action and greater stability, to reduce possible friction and to provide a more direct drive for the driven member. Other advantages will be apparent from the description which follows.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Figure 1:
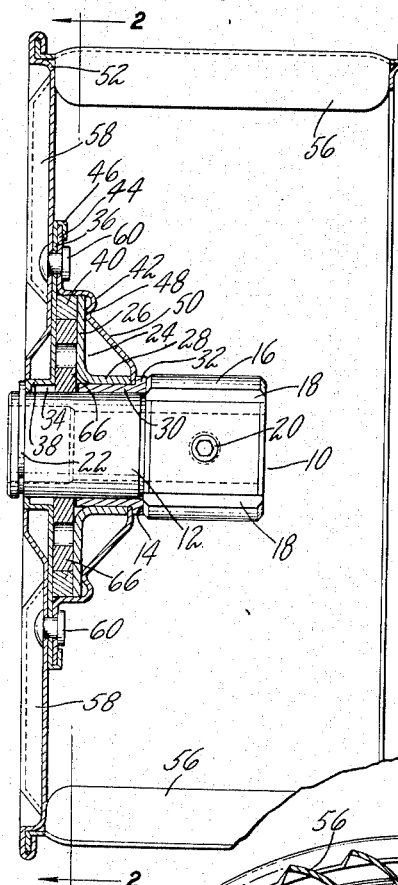
Fig. 1 is a central longitudinal sectional view of a driven member and clutch assembly embodying the invention, the driven member being shown as a blower wheel and the section being taken along the line 1—1 of Fig. 2.

Referring to the drawing, 10 is a rotatable hub having a central bore for receiving a supporting and driving shaft which may be the shaft of an electric motor, the shaft extending into the bore of the hub from the left. The hub has a concentric cylindrical portion 12 and an adjacent outwardly extending annular shoulder 14. Preferably the shoulder 14 is at the left end of an enlarged hub portion 16 which may be longitudinally grooved as indicated at 18, 18. The enlarged grooved portion 16 may serve for driving another mechanism such as the pump of an oil burner. The hub is adapted to be suitably connected with its shaft, a set screw 20 being shown for this purpose. An annular groove is provided in the hub in spaced relationship with the enlarged portion 16, and a split washer 22 is entered in the said annular groove.

Supported on the cylindrical portion 12 of the hub and rotatable thereon is a supporting means for the hereinafter described driven member and for the hereinafter described clutch ring, which supporting means is preferably a composite structure as will be apparent from the following description. The supporting means includes a supporting member 24 which is rotatably supported on the cylindrical portion of the hub. The supporting member comprises a flange 26 which is perpendicular to the axis of rotation and which is widely spaced longitudinally from the shoulder 14 on the hub. The supporting member 24 also comprises a sleeve 28 which extends toward the said shoulder. A bearing bushing 30 is provided, this bearing bushing fitting and being freely rotatable on the cylindrical portion 12 of the hub and engaging at its right end with the shoulder 14 on the hub. The sleeve 28 of the supporting member 24 engages the bearing bushing 30 with a close or pressed fit so that the said sleeve and the said bushing rotate in unison. The sleeve 28 and the bearing bushing 30 cooperate to maintain the flange 26 in proper spaced relationship with the hub shoulder 14. For a purpose to be hereinafter set forth the bushing 30 has an annular rib 32 thereon at or near the end thereof which is adjacent the shoulder 14.

The supporting means also includes a second supporting member 34 also rotatable relatively to the cylindrical portion of the hub. The supporting member 34 includes a flat flange or portion 36 which is perpendicular to the axis of rotation and which is spaced longitudinally from the flange 26. The supporting member 34 also comprises a cylindrical portion 38 which engages the washer 22 to maintain the flange 36 in proper spaced relationship with the washer. The cylindrical portion 38 has an inwardly directed flange which extends toward the hub but which preferably does not engage it, a small clearance being provided.

A relatively rotatable clutch ring 40 is provided which is structurally separate from the supporting means, the ring surrounding the hub and being concentric with the cylindrical portion thereof. When the supporting means includes a supporting member 24 with a flange 26 and a supporting member 34 with a flange 36, the said ring is positioned between the said flanges and is in engagement with the faces thereof.

The said supporting means preferably also includes an annular connecting member 42, this being preferably formed of sheet metal. The annular connecting member 42 comprises a flat portion 44 which is in engagement with and is connected to the flange or flat portion 36 of the connecting member 34. Preferably and as shown, the flange or flat portion 36 of the connecting member 34 is bent at its periphery as indicated at 46 to engage and embrace the periphery of the flat portion 44 of the connecting member 42. The said member 42 has a cylindrical portion which centers and retains the clutch ring 40 and it has an annular rib 48 which engages and presses against the flange 26 of the supporting member 24. Thus the connecting member serves not only to center the ring 40 but also to hold the two flanges 26 and 36 in firm engagement with the ring.

Preferably the connecting member 42 also includes a conical portion 50 which at its smaller end has an annular flange in engagement with the bearing bushing 30 adjacent the rib 32 thereon. The length of the sleeve 28 on the supporting member 24 is such that it engages the said annular flange on the conical portion 50. The conical portion 50 reinforces the supporting members 24 and 34 and cooperates with them to hold the ring 40 in perpendicular relationship to the hub axis.

A relatively rotatable driven member is provided which is preferably a blower wheel of any usual or preferred construction. Preferably and as shown, the driven member or blower wheel comprises a centrally apertured end plate 52, an end ring 54 and an annular series of longitudinal blades 56, 56 connected between the end plate 52 and the end ring 54. The end plate 52 of the blower wheel serves as the means for connecting the blower wheel with the supporting means, and it constitutes a portion of the blower wheel or driven member adjacent the hub 10. The end plate is centrally apertured to receive the cylindrical portion 38 of the supporting member 34. The said end plate 52 has a flat portion perpendicular to the axis of rotation and directly engaging the flange or flat portion 36 of the supporting member 34. As shown, the end plate is formed with four radial ribs 58, 58 which are spaced from the main portion of the plate, the faces of the ribs being flat and constituting the said flat portion of the plate which engages the flat portion or flange 36 of the supporting member 34. The said flange and the said flat portion of the plate 52 are connected by rivets 60, 60 which extend through suitable apertures therein. The said rivets also extend through suitable apertures in the flat portion 44 of the connecting member 42. It will be observed that the flat portion or flange 36 of the supporting member 34 directly engages at one face with the ring 40 and at the opposite face with the flat portion of the plate 52.

The said clutch ring 40 is formed with a plurality of similar circumaxially spaced interior recesses 62, 62 each having an inwardly exposed face 64 which is eccentric with respect to the hub. Positioned within the ring and at least partly within the respective ring recesses 62, 62 are similar rollers 66, 66. When the supporting means comprises flanges such as 26 and 36, the recesses in the ring are open-ended and the rollers are positioned between the said flanges and are thus held against longitudinal movement. The said rollers 66, 66 are of such diameter as to be engageable with the cylindrical portion 12 of the hub and with the respective eccentric faces 64, 64 of the ring recesses, the rollers thus cooperating with the hub and the ring to constitute an overrunning clutch. The rollers 66, 66 are closely adjacent the end of the bearing bushing 30 but they are slightly spaced therefrom.

Figure 2:
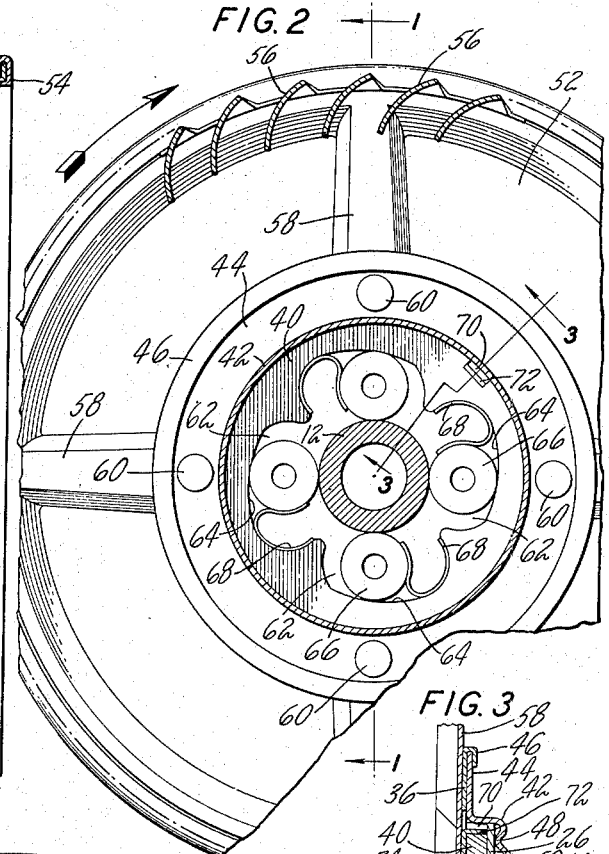
Fig. 2 is a fragmentary transverse sectional view taken along the line 2—2 of Fig. 1, with most of the blower wheel blades omitted for the sake of simplicity.
Figure 3:
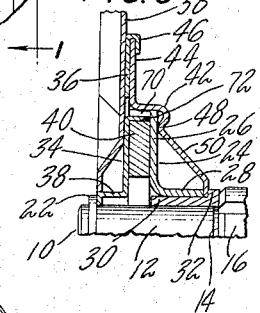
Fig. 3 is a fragmentary longitudinal sectional view taken along the line 3—3 of Fig. 2.

Located at least in part within the respective ring recesses and engaging the respective rollers are springs 68, 68. Preferably and as shown, the springs 68, 68 are U-shaped leaf springs each having one leg engaging with the corresponding roller and having the other leg engaging with a face of the recess. The springs are so positioned that the loop portion of each of them connecting the two legs thereof is adjacent the interior face of the corresponding recess. The springs 68, 68 serve to bias the respective rollers into engagement with the hub and with the corresponding eccentric recess faces 64, 64. When the parts are assembled as shown in Figs. 1 and 2, rotation of the hub 10 in the clockwise direction as viewed in Fig. 2 serves in cooperation with the springs 68, 68 to force the rollers into engagement with the recess faces 64, 64 so that the rollers serve to drive the ring 40 and the parts connected therewith in the direction of hub rotation, that is, in the clockwise direction. However, the ring and the parts connected therewith are free to rotate in the said clockwise direction independently of the hub. While not clearly shown in the drawing, the rollers 66, 66 and the springs 68, 68 are slightly narrower than the ring 40 so as to be freely movable between the flanges 26 and 36.

Preferably the clutch ring 40 is provided with a notch 70 additional to the roller recesses 62, 62. As shown, the notch 70 is in the periphery of the ring. One of the supporting members, preferably the member 34, is provided with a means which extends into the notch 70 to positively insure rotation of the said member in unison with the ring. As shown the said means on the supporting member 34 is an integral tab 72 struck therefrom.

From the foregoing description it will be apparent that the clutch ring and the rollers are between and substantially spaced from the hub shoulder 14 and the washer 22 on the hub. They are held in spaced relationship with the said shoulder by the sleeve 28 of the member 24 and the bearing bushing 30, and they are held in spaced relationship with the said washer by the cylindrical portion 38 of the member 34.

It will also be apparent that the bearing bushing 30 which engages the cylindrical portion of the hub is located between the clutch parts and the shoulder 14, being thus spaced toward the right from the end plate of the blower wheel or driven member. When the driven member is a blower wheel, its center of gravity is spaced toward the right from the end plate and the bearing surfaces are therefore at or near the center of gravity of the said blower wheel or driven member.

The sleeve 28 on the ring supporting means cooperates with the rib 32 on the bearing bushing 30 to positively prevent movement of the bushing toward the left and into engagement with the rollers 66, 66. If the bushing 30 were only frictionally engaged with the sleeve it might engage the said rollers either as the result of faulty initial assembly or as the result of shock during handling and shipment or during use. Engagement of the bearing bushing with the rollers would cause friction and would seriously interfere with the desired free coasting of the clutch ring and of the parts connected therewith.

The connecting member 42 serves not only to connect the two members 24 and 34 with each other and with the ring 40, but it also serves by reason of the portion 50 thereof to firmly hold the ring 40 and the driven member in proper relationship with the hub. Without the said portion 50, rigidity would depend solely on the flanges 26 and 36 of the members 24 and 34 and the ring and the driven member or blower wheel would be less firmly supported and as the result of shock or otherwise the said ring and the end plate of the blower wheel might be shifted out of their perpendicular relationship to the hub.

The ring 40 and the rollers 66, 66 are closely adjacent the end plate of the blower wheel or driven member, and the driving force of the clutch is therefore applied closely adjacent the driven member. Furthermore, the supporting member 34 which is directly connected with the said end plate is also positively connected with the clutch ring by means of the tab 72. Even if the ring were not firmly held by reason of its frictional engagement with the flanges 26 and 36, there would nevertheless be a positive direct drive from the ring to the flange 36 and from the said flange to the driven member.

Figure 4:
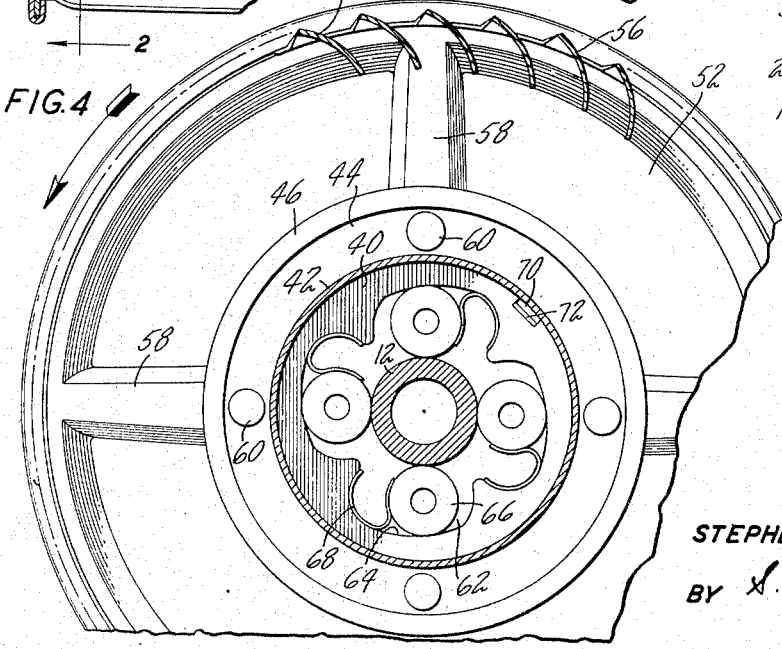
Fig. 4 is a fragmentary view similar to Fig. 2 but showing some of the parts in relatively reversed positions.

Fig. 4 is similar to Fig. 2 but it illustrates the fact that the ring 40 may be assembled with the other parts in a relatively reversed position. This is necessary when the driven member or blower wheel is required to rotate in the counterclockwise direction instead of in the clockwise direction. It will be apparent that by merely reversing the positions of the ring 40 and of the springs 68, 68 during assembly the overrunning clutch may be effective for driving the driven member or blower wheel in either direction as required.

The invention claimed is:

1. The combination of a rotatable hub having a central bore for a supporting and driving shaft and having a concentric cylindrical portion and an adjacent outwardly extending annular shoulder, a relatively rotatable concentric driven member having a portion longitudinally spaced from the said hub shoulder, a relatively rotatable ring concentrically surrounding the said cylindrical hub portion and formed with similar circumaxially spaced interior recesses each having an inwardly exposed eccentric face, the said ring being closely adjacent the said portion of the driven member and widely spaced from the said hub shoulder, a plurality of similar rollers within the said ring of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, two annular supporting members for the ring and the rollers at opposite sides thereof and connected for rotation in unison with the ring, one of the supporting members having a sleeve which extends away from the ring and toward the hub shoulder and which cooperates with the said hub shoulder to hold the other supporting member and the ring and the rollers in widely spaced relationship with the said shoulder, and means connecting the said portion of the driven member with the ring supporting members for rotation in unison therewith.

2. The combination of a rotatable hub having a central bore for a supporting and driving shaft and having a concentric cylindrical portion and an outwardly extending annular shoulder, an annular washer carried by the hub and longitudinally spaced from the shoulder thereon, a relatively rotatable driven member concentric with the hub, a relatively rotatable ring concentrically surrounding the said cylindrical hub portion between the shoulder and the washer and formed with similar circumaxially spaced interior recesses each having an inwardly exposed eccentric face, a plurality of similar rollers within the said ring and of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, two annular supporting members for the ring and the rollers at opposite sides thereof and connected for rotation in unison with the ring, one of the supporting members having a sleeve which cooperates with the hub shoulder to hold the ring and rollers in spaced relationship therewith and the other of the supporting members having a cylindrical portion which cooperates with the washer to hold the ring and rollers in spaced relationship therewith, and means connecting the driven member with the supporting members for rotation in unison therewith.

3. The combination of a rotatable hub having a central bore for a supporting and driving shaft and having a concentric cylindrical portion and an outwardly extending annular shoulder, an annular washer carried by the hub and longitudinally spaced from the shoulder thereon, a relatively rotatable bearing bushing on the cylindrical hub portion and engaging at one end with the hub shoulder, a relatively rotatable driven member concentric with the hub, a relatively rotatable ring concentrically surrounding the said cylindrical hub portion between the shoulder and the washer and formed with similar circumaxially spaced interior recesses each having an inwardly exposed eccentric face, a plurality of similar rollers within the said ring and adjacent one end of the bearing bushing which rollers are of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, two annular supporting members for the ring and rollers at opposite sides thereof and connected for rotation in unison with the ring, one of the supporting members having a sleeve which fits the bearing bushing for rotation in unison therewith and which thus serves to hold the ring and rollers in spaced relationship with the hub shoulder and the other of the supporting members having a cylindrical portion which cooperates with the washer to hold the ring and rollers in spaced relationship therewith, and means connecting the driven member with the said ring supporting members for rotation in unison therewith.

4. The combination of a rotatable hub having a central bore for a supporting and driving shaft and having a concentric cylindrical portion, a relatively rotatable bearing bushing on the cylindrical hub portion, a relatively rotatable driven member concentric with the hub, a relatively rotatable ring concentrically surrounding the said cylindrical hub portion and formed with similar circumaxially spaced interior recesses each having an inwardly exposed eccentric face, a plurality of similar rollers within the said ring and adjacent one end of the bearing bushing which rollers are of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, an annular supporting means for the ring connected for rotation in unison therewith which means has a sleeve which fits the bearing bushing for rotation in unison therewith, means on the bearing bushing cooperating with the said sleeve for positively preventing the said bushing from moving longitudinally toward the said rollers, and means for connecting the driven member with the ring supporting means for rotation in unison therewith.

5. The combination of a rotatable hub having a central bore for a supporting and driving shaft and having a concentric cylindrical portion, a relatively rotatable bearing bushing on the cylindrical hub portion, a relatively rotatable driven member concentric with the hub, a relatively rotatable ring concentrically surrounding the said cylindrical hub portion and formed with similar circumaxially spaced interior recesses each having an inwardly exposed eccentric face, a plurality of similar rollers within the said ring and adjacent one end of the bearing bushing which rollers are of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, two annular supporting members for the ring and the rollers at opposite sides thereof and connected for rotation in unison with the ring, one of the supporting members having a sleeve which fits the bearing bushing for rotation in unison therewith, means on the bearing bushing cooperating with the said sleeve for positively preventing the said bushing from moving longitudinally toward the said rollers, and means for connecting the driven member with the other ring supporting member for rotation in unison therewith.

6. The combination of a rotatable hub having a central bore for a supporting and driving shaft and having a concentric cylindrical portion and an adjacent outwardly extending shoulder, a relatively rotatable bearing bushing on the cylindrical hub portion and engaging at one end with the hub shoulder, a relatively rotatable driven member concentric with the hub and adjacent the end of the bushing which is remote from the hub shoulder, a relatively rotatable ring concentrically surrounding the said cylindrical hub portion and also adjacent the end of the bushing which is remote from the hub shoulder which ring is formed with similar circumaxially spaced interior recesses each having an inwardly exposed eccentric face, a plurality of similar rollers within the said ring and adjacent one end of the bearing bushing which rollers are of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, an annular supporting means for the ring and rollers connected for rotation in unison with the ring which means has a sleeve fitting the bearing bushing for rotation in unison therewith, the said supporting means including a member rigidly connected with the ring and having an annular portion engaging the bearing bushing adjacent the end thereof which engages the hub shoulder which annular portion serves to hold the supporting means and the ring in perpendicular relationship to the hub axis, and means for connecting the driven member with the said supporting means for rotation in unison therewith.

7. The combination of a rotatable hub having a central bore for a supporting and driving shaft and having a concentric cylindrical portion, a relatively rotatable bearing bushing on the cylindrical hub portion which bushing has an annular rib thereon adjacent an end, a relatively rotatable driven member concentric with the hub, a relatively rotatable ring concentrically surrounding the said cylindrical hub portion and formed with similar circumaxially spaced interior recesses each having an inwardly exposed eccentric face, a plurality of similar rollers within the said ring and adjacent the opposite end of the bearing bushing which rollers are of such diameter as to be engageable with the cylindrical hub portion and with the respective eccentric faces of the ring recesses, springs engaging the rollers to bias them into engagement with the cylindrical hub portion and with the respective eccentric recess faces so that the ring is driven by the hub and by the rollers when the former is rotated in one direction and is free to rotate in the same direction independently of the hub, two annular supporting members for the ring and rollers at opposite sides thereof and connected for rotation in unison with the ring, one of the supporting members having a sleeve which fits the bearing bushing for rotation in unison therewith, an annular connecting member rigidly connected with both supporting members and having an annular portion interposed between the rib on the bearing bushing and the end of the said sleeve which said annular portion cooperates with the said rib and with the said sleeve to positively prevent the said bushing from moving longitudinally toward the said rollers, and means for connecting the driven member with the other ring supporting member for rotation in unison therewith.

8. The combination of a rotatable hub having a central bore for a supporting and driving shaft and having a concentric cylindrical portion, a relatively rotatable driven member concentric with the hub and having a flat portion perpendicular to the hub axis, a relatively rotatable ring concentrically surrounding the said cylindrical hub portion and closely adjacent the flat portion of the driven member which ring is formed with similar circumaxially spaced interior recesses each having an inwardly exposed eccentric face, two annular ring supporting members at opposite sides thereof and connected for rotation in unison therewith, one of the supporting members having a flat portion engaging at one face with the ring and engaging at its opposite face with the flat portion of the driven member, means connecting the said flat portion of the driven member with the said flat portion of the last said supporting member for rotation in unison therewith, a plurality of similar rollers within the said ring and of such diameter as to be engageable with the cylindrical hub portion and with the respective eccentric faces of the ring recesses, and springs engaging the rollers to bias them into engagement with the cylindrical hub portion and with the respective eccentric recess faces so that the ring and the ring supporting members and the driven member are driven by the hub and by the rollers when the former is rotated in one direction and are free to rotate in the same direction independently of the hub.

9. The combination of a rotatable hub having a central bore for a supporting and driving shaft and having a concentric cylindrical portion, a relatively rotatable driven member concentric with the hub and having a flat portion perpendicular to the hub axis, a relatively rotatable ring concentrically surrounding the said cylindrical hub portion and closely adjacent the flat portion of the driven member which ring is formed with similar circumaxially spaced interior recesses each having an inwardly exposed eccentric face, two annular ring supporting members at opposite sides thereof and connected for rotation in unison therewith, one of the supporting members having a flat portion engaging at one face with the ring and engaging at its opposite face with the flat portion of the driven member, means connecting the said flat portion of the driven member with the said flat portion of the last said supporting member for rotation in unison therewith, an annular connecting member connected with the flat portion of the last said supporting member and engaging the other supporting member to press it against the ring, a plurality of similar rollers within the said ring and of such diameter as to be engageable with the cylindrical hub portion and with the respective eccentric faces of the ring recesses, and springs engaging the rollers to bias them into engagement with the cylindrical hub portion and with the respective eccentric recess faces so that the ring and the ring supporting members and the connecting member and the driven member are driven by the hub and by the rollers when the former is rotated in one direction and are free to rotate in the same direction independently of the hub.

10. The combination as set forth in claim 9, wherein the connecting member has a flat portion engaging the said flat portion of one of the supporting members, and wherein the last said supporting member is bent at its periphery to engage and embrace the periphery of the connecting member.

11. The combination of a rotatable hub having a central bore for a supporting and driving shaft and having a concentric cylindrical portion, a relatively rotatable driven member concentric with the hub, a relatively rotatable ring concentrically surrounding the said cylindrical hub portion and formed with similar circumaxially spaced interior recesses each having an inwardly exposed eccentric face, the said ring having a notch therein additional to the said recesses, two connected annular supporting members for the ring at opposite sides thereof, means on one of the supporting members projecting longitudinally into the said notch in the ring for causing the supporting members to rotate in unison with the ring, means for connecting the driven member with the said supporting members for rotation in unison therewith, a plurality of similar rollers within the said ring and of such diameter as to be engageable with the cylindrical hub portion and with the respective eccentric faces of the ring recesses, and springs engaging the rollers to bias them into engagement with the cylindrical hub portion and with the respective eccentric recess faces so that the ring and the ring supporting members and the driven member are driven by the hub and by the rollers when the former is rotated in one direction and are free to rotate in the same direction independently of the hub.

12. The combination of a rotatable hub having a central bore for a supporting and driving shaft and having a cencentric cylindrical portion, a relatievly rotatable driven member concentric with the hub, a relatively rotatable ring concentrically surrounding the said cylindrical hub portion and formed with similar circumaxially spaced interior recesses each having an inwardly exposed eccentric face, the said ring having a notch therein additional to the said recesses, two connected annular supporting members for the ring at opposite sides thereof, means on one of the supporting members projecting longitudinally into the said notch in the ring for causing the last said supporting member to rotate in unison with the ring, means connecting the driven member directly with the last said supporting member for rotation in unison therewith, a plurality of similar rollers within the said ring and of such diameter as to be engageable with the cylindrical hub portion and with the respective eccentric faces of the ring recesses, and springs engaging the rollers to bias them into engagement with the cylindrical hub portion and with the respective eccentric recess faces so that the ring and the ring supporting members and the driven member are driven by the hub and by the rollers when the former is rotated in one direction and are free to rotate in the same direction independently of the hub.

References Cited in the file of this patent

UNITED STATES PATENTS

| Number | Name | Date |
|---|---|---|
| 300,503 | Roscoe | June 17, 1884 |
| 800,853 | Kimball | Oct. 3, 1905 |
| 1,798,383 | Roberds | Mar. 31, 1931 |
| 1,921,719 | Allen | Aug. 8, 1933 |
| 2,172,653 | Flogaus | Sept. 12, 1939 |